(12) United States Patent
Jaycobs et al.

(10) Patent No.: US 11,416,928 B2
(45) Date of Patent: Aug. 16, 2022

(54) SWAP CROSSING SYSTEM AND METHOD

(71) Applicant: BGC PARTNERS, INC., New York, NY (US)

(72) Inventors: Rich Jaycobs, Burlington, MA (US); Howard W. Lutnick, New York, NY (US); Mike Sweeting, London (GB)

(73) Assignee: BGC PARTNERS, INC., New York, NY (US)

( * ) Notice: Subject to any disclaimer, the term of this patent is extended or adjusted under 35 U.S.C. 154(b) by 444 days.

(21) Appl. No.: 14/521,491

(22) Filed: Oct. 23, 2014

(65) Prior Publication Data

US 2015/0120525 A1    Apr. 30, 2015

Related U.S. Application Data

(60) Provisional application No. 61/895,397, filed on Oct. 24, 2013, provisional application No. 61/941,165, filed on Feb. 18, 2014.

(51) Int. Cl.
*G06Q 40/00* (2012.01)
*G06Q 40/04* (2012.01)

(52) U.S. Cl.
CPC .................... *G06Q 40/04* (2013.01)

(58) Field of Classification Search
CPC .............. G06Q 40/00; G06Q 40/08
USPC ........................... 705/37, 36 R, 35
See application file for complete search history.

(56) References Cited

U.S. PATENT DOCUMENTS

| | | | | |
|---|---|---|---|---|
| 6,098,051 | A | * | 8/2000 | Lupien ................ G06Q 40/00 705/30 |
| 2003/0177082 | A1 | | 9/2003 | Buckwalter |
| 2003/0220869 | A1 | | 11/2003 | Colle et al. |
| 2008/0262956 | A1 | | 10/2008 | De La Motte |
| 2010/0076885 | A1 | | 3/2010 | Drennan et al. |
| 2011/0137785 | A1 | * | 6/2011 | Lutnick ................ G06Q 40/04 705/37 |
| 2011/0153521 | A1 | | 6/2011 | Green et al. |
| 2012/0215673 | A1 | | 8/2012 | Usher et al. |

FOREIGN PATENT DOCUMENTS

| | | |
|---|---|---|
| JP | 2004046541 | 2/2004 |
| JP | 2004521400 | 7/2004 |
| JP | 2006524852 | 11/2006 |
| JP | 2008535124 | 8/2008 |
| JP | 2010250619 | 11/2010 |
| JP | 2013514593 | 4/2013 |

(Continued)

OTHER PUBLICATIONS

PCT International Search Report dated Feb. 5, 2015 corresponding to PCT International Application No. PCT/US2014/061873 filed Oct. 12, 2014 (2 pages).

*Primary Examiner* — Ojo O Oyebisi

(57) ABSTRACT

An exchange through which swap contracts may be traded. Embodiments may allow a trader to announce a potential crossing before the crossing is requested. The user may then request the crossing between two parties. An announcement window may be kept open through a chaining of announcements. An interloper with a same price but better time than a party to the cross may be kept out of interloping in the cross. A ticker symbol system may list a clearinghouse to be used to execute a requested cross.

15 Claims, 7 Drawing Sheets

(56) References Cited

FOREIGN PATENT DOCUMENTS

| | | |
|---|---|---|
| WO | 2001088818 | 11/2001 |
| WO | 2004097694 | 11/2004 |
| WO | 2006108158 | 10/2006 |
| WO | 2011075411 | 6/2011 |
| WO | 2015061520 | 4/2015 |

* cited by examiner

Figure 2

```
┌─────────────────────────────────────────────────────────────┐
│ receive an indication of a ticker symbol of a swap contract │
│ from a market participant, in which the ticker symbol       │
│ identifies a clearinghouse to be used for trades in the     │
│ swap contract;                                              │
└─────────────────────────────────────────────────────────────┘
                              │
      ┌───────────────────────────────────────────────┐
      │ in response to receiving the indication of the│
      │ ticker symbol, announce a potential crossing  │
      │ of the swap contract to a plurality of market │
      │ participants;                                 │
      └───────────────────────────────────────────────┘
                              │
┌─────────────────────────────────────────────────────────────┐
│ in response to receiving the indication of the ticker       │
│ symbol, intentionally constrain a facilitation of a request │
│ for cross in the swap contract by the market participant    │
│ for a time period;                                          │
└─────────────────────────────────────────────────────────────┘
                              │
      ┌───────────────────────────────────────────────┐
      │ after the period of intentional delay has     │
      │ passed, allow facilitation of the request for │
      │ cross in the swap contract by the market      │
      │ participant;                                  │
      └───────────────────────────────────────────────┘
                              │
┌─────────────────────────────────────────────────────────────┐
│ receive the request for cross identifying the ticker symbol,│
│ in which the request for cross identifies a price, a        │
│ quantity, and two parties;                                  │
└─────────────────────────────────────────────────────────────┘
                              │
      ┌───────────────────────────────────────────────┐
      │ determine the clearinghouse based on the      │
      │ ticker symbol;                                │
      └───────────────────────────────────────────────┘
                              │
      ┌───────────────────────────────────────────────┐
      │ facilitate execution of the cross using the   │
      │ clearinghouse.                                │
      └───────────────────────────────────────────────┘
```

Figure 4

SWAP CROSSING SYSTEM AND METHOD

CROSS REFERENCE TO RELATED APPLICATIONS

This application claims the benefit of U.S. provisional applications 61/895,397 filed Oct. 24, 2013 and 61/941,165 filed Feb. 18, 2014, which are hereby incorporated herein by reference.

FIELD

Some Embodiments relate to trading.

BACKGROUND

Marketplaces match bids and orders for trades in financial instruments. Swap contracts allow traders to trade based on rates.

SUMMARY

The following should be understood as embodiments, not as claims.

A. An apparatus comprising: one or more processors; and one or more non-transitory media having stored thereon a plurality of instructions that when executed by the one or more processors, cause the apparatus to: receive an indication of a swap contract from a market participant; in response to receiving the indication of the swap contract, announce a potential crossing of the swap contract to a plurality of market participants; in response to receiving the indication of the swap contract, intentionally constrain a facilitation of a request for cross in the swap contract by the market participant for a time period; after the period of intentional delay has passed, allow facilitation of the request for cross in the swap contract by the market participant; receive the request for cross from the market participant, in which the request for cross identifies a price and a quantity; determine that no better price for the request for cross for either of the two parties exists in the market; determine that an equal price for the request for cross for one of the two parties with a better time priority than the cross exists in the market; and facilitate execution of the cross between the two parties at the price and for the quantity.

A.1. The apparatus of claim A, in which allowing facilitation includes allowing for a limited amount of time and in which the request for cross is received during that limited amount of time. A.2. The apparatus of claim A, in which the indication of the swap contract includes a ticker symbol that identifies a clearinghouse to be used for trades involving the swap contract, and in which facilitating execution includes facilitating execution using the clearinghouse. A.3. The apparatus of claim A, in which allowing facilitation includes allowing for a limited amount of time and in which the apparatus is controlled to: at a time equal in length to the period of time before the limited amount of time ends, receive a second indication of the swap contract from the market participant; in response to receiving the second indication of the swap contract, re-announce the potential crossing of the swap contract to the plurality of market participants; and in response to receiving the second indication of the swap contract, continuing to allow facilitation for an extra period of time after the limited amount of time. A.4. The apparatus of claim A, in which the market participant includes a broker.

B. An apparatus comprising: one or more processors; and one or more non-transitory media having stored thereon a plurality of instructions that when executed by the one or more processors, cause the apparatus to: receive an indication of a ticker symbol of a swap contract from a market participant, in which the ticker symbol identifies a clearinghouse to be used for trades in the swap contract; in response to receiving the indication of the ticker symbol, announce a potential crossing of the swap contract to a plurality of market participants; in response to receiving the indication of the ticker symbol, intentionally constrain a facilitation of a request for cross in the swap contract by the market participant for a time period; after the period of intentional delay has passed, allow facilitation of the request for cross in the swap contract by the market participant; receive the request for cross identifying the ticker symbol, in which the request for cross identifies a price, a quantity, and two parties; determine the clearinghouse based on the ticker symbol; and facilitate execution of the cross using the clearinghouse.

B.1. The apparatus of claim B, in which allowing facilitation includes allowing for a limited amount of time and in which the request for cross is received during that limited amount of time. B.2. The apparatus of claim B, in which the apparatus is configured to: determine that an equal price for the request for cross for one of the two parties with a better time priority than the cross exists in the market; and in which facilitating the execution includes facilitate execution of the cross between the two parties at the price and for the quantity. B.3. The apparatus of claim B, in which allowing facilitation includes allowing for a limited amount of time and in which the apparatus is controlled to: at a time equal in length to the period of time before the limited amount of time ends, receive a second indication of the ticker symbol from the market participant; in response to receiving the second indication of the swap contract, re-announce the potential crossing of the swap contract to the plurality of market participants; and in response to receiving the second indication of the swap contract, continuing to allow facilitation for an extra period of time after the limited amount of time. B.4. The apparatus of claim B, in which the apparatus is controlled to: determine that, compared to the price, a better price for fulfilling at least a portion of the request for cross for at least one of the two parties exists in the market; and in which facilitating execution of the cross includes facilitating execution of the at least the portion at the better price. B.4.1. The apparatus of claim B.4, in which facilitating execution includes facilitating execution with the at least one party and another party that is different from either of the two parties. B.4.2. The apparatus of claim B.4, in which facilitating execution includes facilitating execution between the two parties.

C. An apparatus comprising: one or more processors; and one or more non-transitory media having stored thereon a plurality of instructions that when executed by the one or more processors, cause the apparatus to: receive a first indication of a swap contract from a market participant; in response to receiving the first indication of the swap contract, announce a potential crossing of the swap contract to a plurality of market participants; in response to receiving the first indication of the swap contract, intentionally constrain a facilitation of a request for cross in the swap contract by the market participant for a first amount of time; after the first amount of time of intentional delay has passed, allow facilitation of the request for cross in the swap contract by the market participant for a second amount of time; the first amount of time before the second amount of time ends, receive a second indication of a swap contract from the market participant; in response to receiving the second indication of the swap contract, re-announce the potential crossing of the swap contract to the plurality of market participants; in response to receiving the second indication of the swap contract, allow facilitation of the request for cross in the swap contract by the market participant for the second amount of time after receiving the second indication so that a total amount of time that facilitation of the request for cross is allowed by the market participant includes twice the second amount of time based on the first and second indications of the swap contract; receive the request for cross from the market participant, in which the request for cross identifies a price, a quantity and two parties; facilitate execution of the cross.

C.1. The apparatus of claim C, in which the apparatus is caused to: at a time when twice the second amount of time has passed from receiving the first indication of the swap contract, receive a third indication of the swap contract from the market participant; in response to receiving the third indication of the swap contract, re-announce the potential crossing of the swap contract to the plurality of market participants; in response to receiving the third indication of the swap contract, allow facilitation of the request for cross in the swap contract by the market participant for the second amount of time after receiving the third indication so that a total amount of time that facilitation of the request for cross is allowed by the market participant includes three times the second amount of time based on the first, second, and third indications of the swap contract; C.2. The apparatus of claim C, in which the apparatus is configured to: determine that an equal price for the request for cross for one of the two parties with a better time priority than the cross exists in the market; and in which facilitating the execution includes facilitate execution of the cross between the two parties at the price and for the quantity. C.3. The apparatus of claim C, in which the indication of the swap contract includes a ticker symbol that identifies a clearinghouse to be used for trades involving the swap contract, and in which facilitating execution includes facilitating execution using the clearinghouse. C.4. The apparatus of claim C, in which the apparatus is controlled to: determine that, compared to the price, a better price for fulfilling at least a portion of the request for cross for at least one of the two parties exists in the market; and in which facilitating execution of the cross includes facilitating execution of the at least the portion at the better price. C.4.1. The apparatus of claim C.4, in which facilitating execution includes facilitating execution with the at least one party and another party that is different from either of the two parties. C.4.2. The apparatus of claim C.4, in which facilitating execution includes facilitating execution between the two parties.

D. An apparatus comprising: one or more processors; and one or more non-transitory media having stored thereon a plurality of instructions that when executed by the one or more processors, cause the apparatus to: receive a request to announce a potential cross of a swap contract between two parties; in response to receiving the request to announce, transmit an announcement to a marketplace, adjust an interface to show a countdown of an announcement time period, and control the interface to prevent submission of a request for cross during the announcement time period; in response to an end of the announcement time period, adjusting the interface to show that the announcement time period is over, adjust the interface show a countdown of a submission time period during which a request for cross is allowed to be submitted, and adjust the interface to allow submission of the request for cross during the submission time period; receive a request to submit the request for cross to the marketplace through the interface during the submission time period; and in response to receiving the request to submit the request for cross during the submission time period, transmit the request for cross of a swap contract to the marketplace.

D.1. The apparatus of claim D, in which the apparatus is controlled to: receive a change through the interface of one of the two parties during the submission time; and in which the request for cross indicates the changed party instead of one of the two parties. D.2. The apparatus of claim D, in which the apparatus is controlled to: receive a request to extend the submission time at least an amount of time equal to the announcement time period before the submission time period ends; submit a second request to announce during the submission time at least an amount of time equal to the announcement time period before the submission time period ends; and in response to submitting the second request, transmit a second announcement to the marketplace and extend the submission time. D.3. The apparatus of claim D, in which the announcement includes a ticker symbol that identifies a clearinghouse to be used for trades involving the swap contract. D.4. The apparatus of claim D, in which controlling the interface to prevent submission of the request for cross during the announcement time period includes disabling a button and in which adjusting the interface to allow submission of the request for cross during the submission time period includes enabling the button.

BRIEF DESCRIPTION OF THE FIGURES

FIG. 2 shows an example interface;
FIG. 4 shows an example method according to some embodiments.

DETAILED DESCRIPTION

Example Embodiments

Financial instruments may be traded through a trading apparatus. A trading apparatus may facilitate matching, exchange, settlement, tracking, calculating and/or other actions that may aid in the establishment of a market for the financial instruments. One example financial instrument that may be traded includes a futures contract. Such a contract may grant one party some right from another party in the future in exchange for some cost now. Another example financial instrument that may be traded includes a swap contact. Such a contract may grant one party a payment based on a first interest rate and another party a payment based on a second interest rate. For example, a first party may be granted a floating rate and a second party may be granted a fixed rate.

Figure 1:
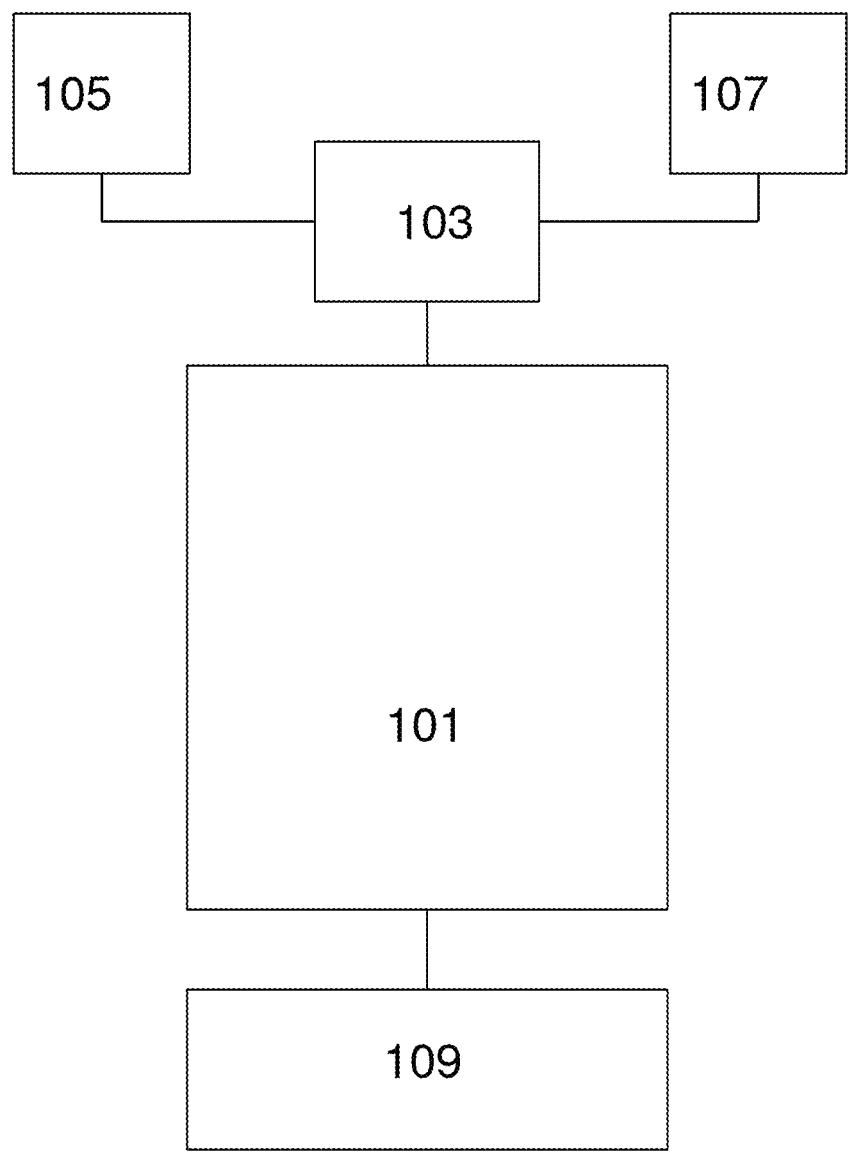
FIG. 1 shows a block diagram of an example apparatus.

FIG. 1 illustrates an example trading apparatus 100 that may be part of some embodiments. It should be recognized that this trading apparatus is given as a non-limiting example only and that other embodiments may include any desired structure. The example trading apparatus includes an electronic marketplace 101, a broker 103, a clearinghouse 105, a first party 107, and a second party 109.

First party 107 and second party 109 may come to a negotiated agreement to trade in a swap. For example, the first party may agree to take a US LIBOR 3 month floating rate plus 25 basis points and a second party may agree to take a US treasury 5 year fixed rate in a swap exchange. The parties may agree to trade in contracts that have a notional value of 1 million dollars (such a notional size may be set by convention, by the exchange, by the clearinghouse, by a regulator, by the parties, and/or any desired alternative). The parties may agree to trade some number of such contracts. This negotiation may take place through an electronic messaging system, through an auction or bidding process, through a direct vocal negotiation, and/or in any manner desired.

In some embodiments, the first party and/or the second party may notify the broker 103 of the negotiated agreement. In some embodiments, the first party may notify the broker of a desire to make a trade in swaps and the broker may arrange the negotiated agreement with the second party. For example, by looking in an order book for a matching order, by calling possibly interested parties, by placing the order in a matching engine queue to find a matching, and so on. It should be recognized that a variety of manners of coming to a negotiated agreement may be used in various embodiments.

Broker 107 may determine parameters for a negotiated agreement between the first and second parties for a swap exchange (e.g., by receiving some or all of the parameters from a party or matching venue, by negotiating some or all of the parameters for a party, by defining some or all of the parameters, etc.). Parameters may include a size, a price, a contract, the parties, and/or a clearinghouse to use for a trade. For example, the first party may identify a contract, a price, a size, a clearinghouse and the second party to the broker (e.g., through an electronic communication, by phone, in person, etc.).

Figure 2:
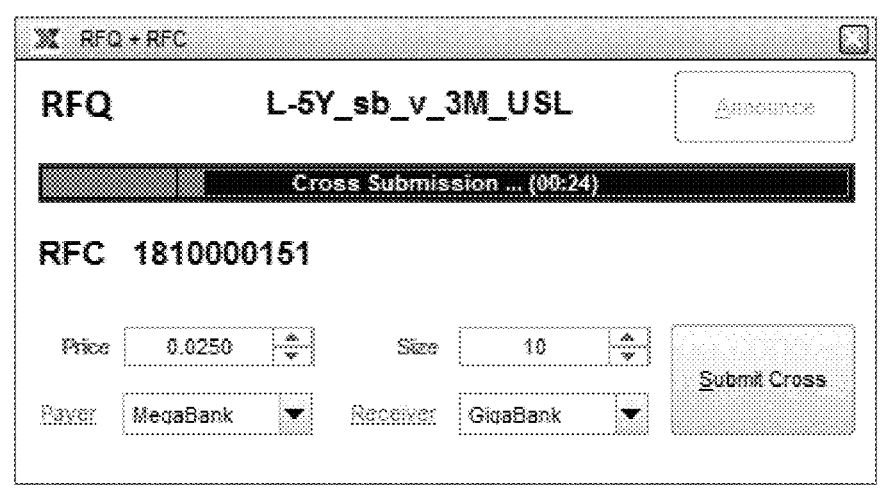

The broker may submit information about the desired trade to the electronic marketplace in order to facilitate an execution of the trade. For example, the broker may request a quote for the contract to the marketplace. After some period of required delay, the broker may submit a request for cross to the marketplace. The broker may submit such information through an electronic communication with the marketplace identifying the parameters of a requested cross. FIG. 2 illustrates an example GUI that may be used to submit information to a marketplace for a swap trade. The broker may notify the first party and/or second party of a result of the attempted execution. A broker may operate a computing device to facilitate the trading of swap contracts through an electronic marketplace. Information may be received by and/or transmitted from such a device to facilitate trading as described herein. The computing device may track and maintain information to enable a display such as the display of FIG. 2. One example broker may include BGC partners.

Electronic marketplace 101 may include one or more computing devices that act as a matching facility for instruments. Such computing devices may execute instructions on non-transitory medium to enable the trading of swap contracts. The marketplace may list swap contracts for trading. The marketplace may allow bids and offers to be entered for swap contracts. The marketplace may allow requests for quotes to be entered for swap contracts. The marketplace may allow requests for cross for swap contracts to be entered with an announcement restricts that is explained herein. The marketplace may maintain an order book for orders in swap contracts. The marketplace may match orders for trades in swap contracts. The marketplace may facilitate execute of trades in swap contracts (e.g., through clearing house 109). The electronic marketplace may also allow trading in one or more other financial instruments such as futures contacts. One example electronic marketplace may include ELX.

For example, the marketplace may list a swap contract for trading. The listing may be transmitted to the public and be viewed through an interface of a computing device. Orders for both sides of the swap contract may be received by the marketplace.

The marketplace may match orders (e.g., when they have the same price). The marketplace may match orders in a FIFO, pro-rata, and/or other fashion. The marketplace may transmit information about matching orders to the clearinghouse so that the clearinghouse can execute a trade. The marketplace may notify parties to a trade of a match and/or execution of a trade. The marketplace may maintain information about orders in one or more order queues. For example orders to buy may be maintained in a price and time priority buy queue and orders to sell may be maintained in a price and time priority sell queue. Matching priced orders may be matched and orders may be executed to fulfill those matched orders (e.g., through a clearinghouse).

As another example, a marketplace may receive an indication that parties desire to trade a swap. The marketplace may first announce that a trade in the swap is desired to the public before making the trade. For example, a request for quote may be submitted to the marketplace. In response to receiving the request, the marketplace may announce the requested quote to the public. After some time has passed (e.g., 5 seconds), the parties that desire to trade together may be allowed to do so. In some embodiments, a broker to the parties may be enabled to submit a request for cross after the time period for some amount of time after the time period (e.g., 25 seconds). In other embodiments, the marketplace may treat an initial submission as a request for cross after the time period has passed eliminating such a second submission from a broker.

If an order that is at a better price (e.g., higher or lower depending on whether a party is selling or buying) for either of the parties requesting the cross is at the marketplace at the end of the time period (e.g., it was there before the request for quote is announced or is received during the time period and is still pending at the end of the time period), the better order may interlope in the requested cross. If there is a remaining size after the interloper's order is fulfilled, then the remaining size may be crossed in the requested cross and/or the remaining order may be canceled. If no such better order is available, then the cross requested may be made and the exchange may facilitate the requested trade (e.g., through clearinghouse 109). Such an ability of an interloper may help to assure that a best price is achieved for parties to a trade.

Clearinghouse 109 may include one or more computing devices that enable clearing and/or settlement of trades. The clearinghouse may receive information identifying a trade (e.g., from a marketplace in response to a match) and may enter into one or more contracts to facilitate the trade. For example, the clearinghouse may enter a single swap contract between a first party and a second party to a swap contract trade. As another example, a clearinghouse may enter into a swap contract with the first party and a second swap contract with the second party. The contracts may have the feeling of being between the first and second party, but the clearinghouse may actually be a middle party between the two parties. One example clearinghouse may include LCH.

Some embodiments may use any number of clearinghouses. A party submitting information to an exchange may identify a clearinghouse to be used (e.g., a broker may identify the clearinghouse to an exchange). An exchange may use a default clearinghouse if no clearinghouse is identified. A listing of a swap contract may identify a clearinghouse that is used for that swap contract as part of the listing. In some embodiments, a swap contract may have all the same parameters but use a different clearinghouse. Some implementations may treat such swap listings as fungible and may resolve the clearinghouse issue in any of a variety of manners (e.g., using a preferred clearinghouse, using a cheaper clearinghouse, etc.). Other implementations may treat such swap contract listings as non-fungible. A database may map listings to clearinghouses. Later examples illustrate how a portion of a ticker symbol may be indicative of a clearinghouse. A marketplace may read such a portion of a listing to determine a clearinghouse to use for a trade execution.

In some embodiments, parties may be required to have contracts in place with the clearinghouse to enable use of a clearinghouse. The marketplace may request that the parties specify that they have such contracts in place before allowing trading using the clearinghouse. A clearinghouse may receive information from a marketplace identifying a trade to be made that includes the parties to the trade (e.g., as a formatted electronic message). The clearinghouse may verify that the parties have properly signed contracts with the clearinghouse. The clearinghouse may notify the marketplace whether the parties are properly authorized. The clearinghouse may notify the marketplace, broker and/or the parties that the trade has occurred. The marketplace may notify the parties and/or broker that the trade has occurred. If a party does not have a contract in place and is required to have one, a clearinghouse may reject a trade by notifying the parties, broker and/or the marketplace that a trade will not be permitted. A marketplace that receives such a notice may forward it to a party. A broker may track clearinghouses that parties are authorized to use to ease the process of engaging in trading.

In some embodiments, the marketplace may require that the broker has authority to trade on behalf of the parties. The marketplace may request that the broker specify that they have such authority. For example, a broker may be required to submit a copy of an authorization for trading to the marketplace before the marketplace allows the broker to submit orders for a client.

It should be recognized that the example of FIG. 1 is given as a non-limiting example only. Other embodiments may take other forms and/or have other components. For example, in some embodiments, a broker may not be used but rather the parties may be participants in the marketplace directly. Some embodiments may include an exchange, a non-exchange trading venue, a matching engine, a broker computing device, a marketplace with self-clearing features, and/or any other desired components.

Figure 3:
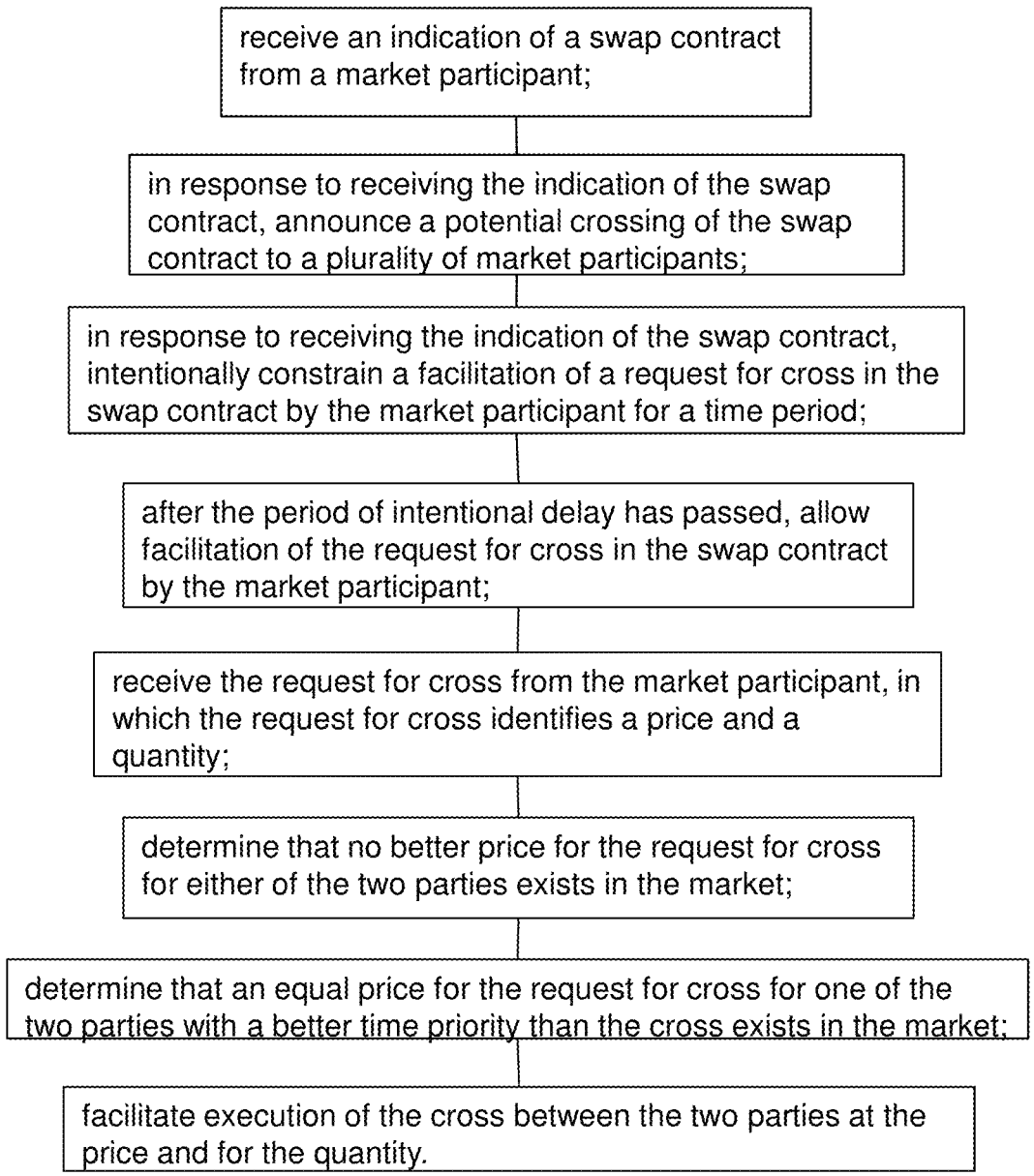
FIG. 3 shows an example method according to some embodiments.
Figure 5:
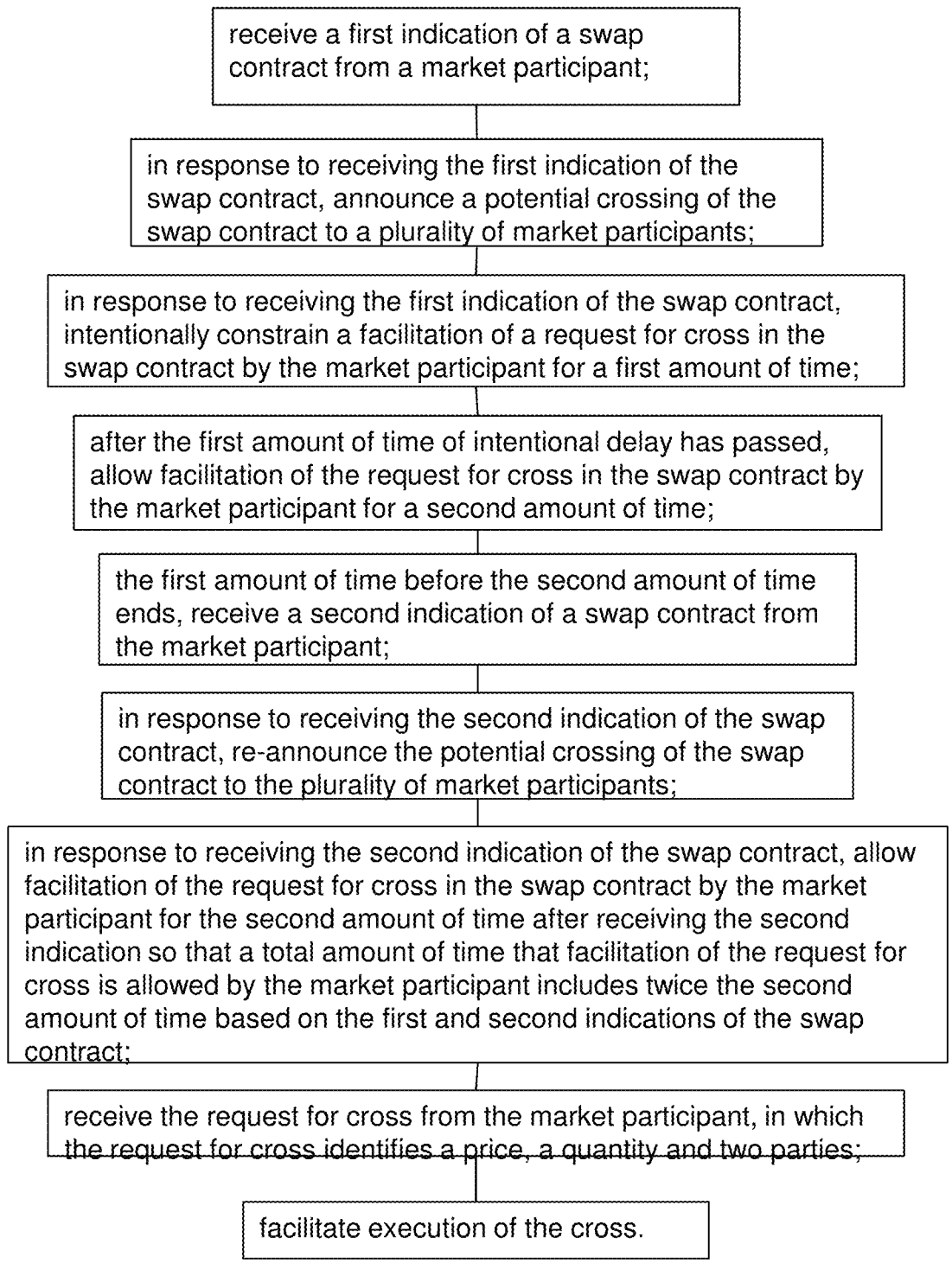
FIG. 5 shows an example method according to some embodiments.

FIGS. 3, 4 and 5 illustrates an example method that may be performed in some embodiments. Such a method may be performed by a marketplace such as marketplace 101 and/or a user computing device (e.g., such as through a broker interface program that communicates with a marketplace to submit information).

As indicated in FIG. 3, some embodiments may receive an indication of a swap contract from a market participant. The indication may be received by a marketplace from a broker (or a party that is a participant in the marketplace). The indication may include an announcement of a requested crossing. The indication may identify two interest rates (e.g., a fixed rate and a floating rate). For example, a 7 year semiannual bond may be identified as a fixed rate and a 3 month US LIBOR may be identified as a floating rate. The indication may identify a clearinghouse to be used. For example, an indication may identify LCH as a clearinghouse. Such information may be submitted by a broker or party, such as by using an interface like the one illustrated at FIG. 2.

Figure 7:
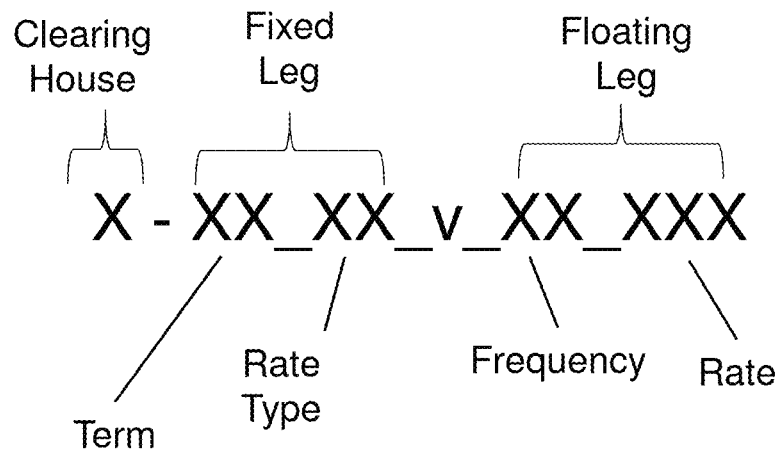
FIG. 7 illustrates an example symbol construction according to some embodiments.

In some embodiments, an indication of a swap contract may include an indication of a ticker symbol that identifies a clearinghouse to be used for trades in the swap contract. FIG. 4 illustrates a method that includes such a ticker symbol. FIG. 7 illustrates an example layout of such a ticker symbol.

As indicated in FIG. 3, some embodiments may in response to receiving the indication of the swap contract, announce a potential crossing of the swap contract to a plurality of market participants. For example, a potential cross may be published by the marketplace for participants to see. Information may be transmitted to each of a plurality of participants identifying some aspect of a potential cross. The request may identify terms of the contract to be traded. For example, the clearinghouse, fixed leg, and floating leg of the contract to be traded may be identified in a listing of the marketplace. A listing structure that may be used is illustrated in FIG. 7. The listing may be determined and published in response to receiving the indication by the marketplace. Announcing may include announcing some characteristics of a cross, such as an identity of a contract. In some embodiments only such an identity may be revealed. In other embodiments more information about an announced cross may be revealed (e.g., parties, size, etc.).

As indicated in FIG. 3, some embodiments may in response to receiving the indication of the swap contract, intentionally constrain a facilitation of a request for cross in the swap contract by the market participant for a time period. In some embodiments, a request for cross may only be allowed to be submitted and/or may only be acted upon if it is received after a published request for quote has been made. The request for cross may be required to be acted on or submitted in a time period after the publishing of the request for quote (e.g., in 25 seconds, in 5 seconds, in 1 minute, in 5 minutes, in half an hour, in an hour, in a day, etc.). In some embodiments, a GUI interface such as that of FIG. 2 may disable a submission button until after the period has passed. Some embodiments may include enabling a submission ability for a request for cross in response to a period of time having passed after an announcement of a request for quote. It should be recognized that after an announcement is intended to indicate any or all of, for example, after a receipt of the announcement by a marketplace, after a transmission of the announcement to the marketplace, after a processing by the marketplace, and/or after the marketplace makes an announcement public.

As indicated in FIG. 3, some embodiments may, after the period of intentional delay has passed, allow facilitation of the request for cross in the swap contract by the market participant. A GUI may be enabled to allow submission, for example. Some embodiments may constrain at all times except for a period after an announcement period. For example, an announcement period may last 1 millisecond, 1 second, 5 seconds, 10 seconds, 30 seconds, 1 minute, 5 minutes, 1 hour, 1 day, etc. (e.g., the request for quote may be made and the time after that may count as the announcement period). After the announcement period the ability to request a cross and/or ability to act on a requested cross may be enable for some period of time (e.g., 5 seconds, 25 seconds, 1 minute, 1 hour, etc.).

As indicated in FIG. 3, some embodiments may receive the request for cross from the market participant, in which the request for cross identifies a price and a quantity. The marketplace may determine that the request is made during an allowed period of time (e.g., during the 25 seconds after an announcement period has ended). The marketplace may then act on the request because it is made in an allowed period. The marketplace may refuse to act on requests that are not made in the allowed period. A request for cross may identify the price, size and/or parties to the contract. For example, the request for cross may identify that a first party and a second party want to engage in a trade with a floating size at 60 basis points above the benchmark for 50 contracts that have a notional value of 1 million dollars. The notional value may be a standard value set by the exchange. Such a request may be received from a broker and/or party to the trade (e.g., through use of an interface such as that of FIG. 3).

A marketplace may assign a numerical identifier to an announced cross. When a request for cross is received, it may be required to have a numerical identifier that matches the one assigned to the requested quote to verify that a proper announcement was made. Other embodiments may not include such a limitation. For example, a broker may announce a cross of a particular contract and then later change the parties and/or size of a cross from an initial intent in some embodiments. A broker may be limited to a single crossing per announce in some embodiments and/or may be allowed to make any number of crossings during an allowed period. A scheme that limits the crossings to one per announce may give the market an accurate view of the activity in a crossing before the crossing is executed. A scheme that allows any number of crossings per announce may allow a faster rate of crossing for participants.

As indicated in FIG. 3, some embodiments may determine that no better price for the request for cross for either of the two parties exists in the market. Also as indicated in FIG. 3, some embodiments may determine that an equal price for the request for cross for one of the two parties with a better time priority than the cross exists in the market. These determinations may be a single determination, a same determination, and/or different determinations.

In such an example, a tie in price may be treated as a worse order. This may violate standard price and time priority standards. For example, if an interloper order has a same price but was pending before a requested cross, the requested cross may be executed even though standard price and time priority mechanisms would have the interloper order matched (because it was pending first).

On the other hand, a marketplace may look at orders for the contract received before the announcement and after the announcement by before a request for cross is received and/or acted upon. If an order is pending that has a better price than the requested cross price for either party to the requested cross, then that order may be used to fulfill at least part of the requested cross rather than the specifically negotiated cross identified by the request for cross.

For example, a requested cross that has a premium of 60 basis points on a floating side and seeks 15 contracts may be received. An order may be received during an announcement period asking for a fixed side and offering a premium of 59 basis points for 3 contracts. The marketplace may match that 59 basis point order with the requested cross giving a floating rate side of the cross a better deal for 3 of the 15 requested contracts.

In some embodiments, the fixed rate side of the requested cross may be left with 3 unfulfilled contracts. The 12 remaining contracts may be matched in the requested cross. In other embodiments, the remaining 12 requested by the floating side and the entire 15 requested by the fixed side may be left unfulfilled. A scheme that matches orders in part may allow for quicker filling of orders. A scheme that cancels unfulfilled orders may allow parties to control the entirety of their order and be secure that they will not be stuck with an only partially fulfilled order. Some embodiments may allow parties to a requested cross to identify a treatment of unfulfilled order portions and may act in accordance with such an identified treatment.

If there is no such better priced order, then the requested cross may be acted on in whole. In some embodiments, a request for cross may be treated as a block trade if it exceeds a threshold size (e.g., more than 1 contract, more than 10 contracts, more than 100 contracts, more than 1000 contracts, more than 10000 contracts, etc.).

As indicated in FIG. 3, some embodiments may facilitate execution of the cross between the two parties at the price and for the quantity. Some embodiments may facilitate execution of the request for cross between the parties and through an identified clearinghouse at the price and with the size identified by a requested cross. A clearinghouse may be sent information to fulfill the trade as requested (and/or any trade that is determined to be made such as a trade involving an interloper and a trade involving the parties with a lower size). The clearinghouse may execute the trade in response.

Parties may be notified of the outcome of a request for quote and/or request for cross by a marketplace, broker and/or by a clearinghouse.

It should be recognized that the example method is given as a non-limiting example only. Other embodiments may include other actions in other orders.

The methods of FIG. 4 and FIG. 5 include similar elements to the method of FIG. 3. These methods may be combined in any combination in part or in whole together and/or with the method of FIG. 6 or other elements described herein.

In the method of FIG. 4, the method includes receive an indication of a ticker symbol of a swap contract from a market participant, in which the ticker symbol identifies a clearinghouse to be used for trades in the swap contract. The method of FIG. 4 does not explicitly include a discovery that there are no interloper orders as the method of FIG. 3 does. This discovery may be made in some situations but may not be made in others. As discussed elsewhere such discovery may affect the way a requested cross is executed (e.g., price, using the interloper order, in part, etc.).

For example, rather than separate submissions of an announcement and a request for cross, a single submission may be made. The single submission may be treated by a marketplace such that an announcement is made and after the announcement period, the requested cross is acted upon. In such a single receipt embodiment, the requested cross may be given a time priority equal to when it is submitted and/or the cross may be given a time priority of the end of the announcement period for purposes of interloper matching. This may be useful, for example, to minimize a time between an end of an announcement period and an execution of a cross because rather than waiting for a submission of the cross, the cross may be automatically executed on as if it was received at the moment the announcement period ended. In some such implementations, rather than acting on the cross immediately after an announcement, such an indication may identify that a cross should be acted on at some time (e.g., a time after an announcement period, a time after a notification has been received). This may allow a submitter to introduce some delay between an end of an announcement period and acting on a cross if such a delay is desired (e.g., to simulate human activity, to allow cancelation time, etc.)

As another example, some embodiments may include a variety of order types. One example order type may include an all or none type order. In such an order, a requested cross may indicate they the parties desire all of their order to be completed or none of it. In such a situation, if the cross has no interloper, then it will execute as normal. However, if there is an interloper that would match with one side of the cross, then the order may behave differently. For example, if there are sufficient interloping orders to fill an entire first side of the cross, then those one or more orders may be used to fill that first side of the cross. If, however, there are not sufficient order to fulfill that side of the cross, the cross may not be executed because it could not be completed in full. A same rule may be applied to the second side of the cross under such an order type. Using such a rule, parties can guarantee a fulfilled order for both parties to a cross.

Another order type may include a market order cross. In such an order, a requested cross may indicate a preferred price but also that the parties are willing to execute the cross at a market price. In such a situation, it there is no interloper, then the cross may execute as described above. If there is an interloper, then the cross may execute at the interloper price between the original parties to the cross rather than at the preferred price. Using such an order, parties can guarantee that they will cross with one another but may not be able to guarantee a price of such a cross.

Yet another type of cross may include a limit order cross. Such a limit order cross may add a level of protection to one or more sides of a cross when compare to the market order cross. In such an order, a limit may be priced on the market price. So, if the market price gets too far from a preferred price, then a standard interloper rule described above may apply. This restriction may go in either direction and/or only one direction of a price deviation from a preferred price. This limit may protect one or both parties to a cross from crossing at a price that is far from an expected price. If there is an interloper and the market price is in the limit, then the cross may execute as a market order cross.

Although examples of market and limit crosses are given in terms of a preferred price, other embodiments may use a price based on some pricing mechanism (e.g., mid-point, last executed cross, etc.)

A marketplace may receive a cross of one of these or another type and determine how such a cross should be matched (e.g., at what price, with or without one or more interlopers, etc.) based on the terms of the cross type and the existence of any interlopers. Order types may be combined in any combination desired (e.g., an all or nothing limit order cross).

In yet another example, in some embodiments, if an interloper exists and is matched with one side of a cross, there may be extra demand on the other side of the cross left unfilled. In some embodiments, that extra demand may be converted into a pending order. In other embodiments, that extra demand may be canceled.

As still further examples, announcement periods may have a variety of features.

For example, in some embodiments, a payment may be required to make an announcement. Such a payment may discourage constant announcing or frivolous announcing. A broker may be charged to make an announcement by a marketplace. In some embodiments, such a charge may be incurred if there is no cross after an announcement. In some embodiments, such a charge may be incurred after some number of announcements (e.g., 1, 2, 5, 10, 20, 100). In some embodiments, such a charge may be incurred after some number of announcements without a cross (e.g., 1, 2, 5, 10, 20, 100). A marketplace or other entity such as a broker computing device may track such information and apply charges as desired.

In some embodiments, each submitted cross may be required to be paired with a unique announcement. In other embodiments, an announcement may allow any number of crosses to be made during a time period thereafter. In some such embodiments, when an announcement is made by a broker, that announcement may be considered to be in effect until the end of a period (e.g., 25 seconds after the announcement) for all trading entities in the market and/or all members of a trading entity (e.g., all brokers that work for a trader that made the announcement). During that time, anyone may submit crosses without an additional announcement.

In some embodiments, a user may desire to have the ability to submit a cross as quickly as possible. Accordingly, the user (such as a broker or other trader like an algorithmic trading computer) may maintain an ongoing announcement set. For example, in a situation where an announcement period is 5 seconds and a submission allowed period after the announcement period is 25 seconds, a user may maintain an ongoing announcement chain as described below. FIG. 5 illustrates an example method in which an ongoing announcement chain may be made. To start a chain, a first announcement may be made. A first submission period may begin after the 5 second first announcement period. 20 seconds into the first submission period, another announcement may be made. Accordingly, during the last 5 seconds of the first submission period, a second announcement period may begin. So, when the first submission period ends after 25 seconds, the second announcement period will also end and a second submission period will begin. Similarly, when this second submission period is 5 seconds away from its end a third announcement may be made. This cycle may continue until a cross is submitted. Accordingly, a window for submission may be kept open for submitting a cross. Combining this embodiment with a cost per announce embodiment may result in a higher cost for maintaining a constantly open window than for using an announce window only when a cross is specifically desired.

In the method of FIG. 5, a method start similarly to that of the method of FIG. 3. The method does not explicitly include an identified clearinghouse as in the method of FIG. 4, but it may include such a clearinghouse and ticker symbol. The method ends without explicitly checking for an interloper or using an identified clearinghouse, but it may do some in some embodiments.

The method of FIG. 5 includes the first amount of time before the second amount of time ends, receive a second indication of a swap contract from the market participant. The first amount of time may correspond to the announcement period discussed above. The second amount of time may correspond to the submission period discussed above.

The method of FIG. 5 includes in response to receiving the second indication of the swap contract, re-announce the potential crossing of the swap contract to the plurality of market participants. Such a re-announcement may be similar to an initial announcement. Some embodiments may not include or require such a re-announcement.

The method of FIG. 5 includes in response to receiving the second indication of the swap contract, allow facilitation of the request for cross in the swap contract by the market participant for the second amount of time after receiving the second indication so that a total amount of time that facilitation of the request for cross is allowed by the market participant includes twice the second amount of time based on the first and second indications of the swap contract. This may correspond to, for example, allowing a submission period open for 50 seconds in the 25 second submission window example above. Any number of successive announcements may be made in this manner to keep a submission period open for as long as desired according to parameters of a desired marketplace.

In some embodiments, if a cross is submitted, it may render an announcement used so that no further crosses may be submitted from that announcement. A new set of announcements may be required to submit another announcement. Such a set may be similar to the above described set that keeps a submission window open. In some situations, a cross may be submitted at a time during an announcement period and during a submission period. In such a situation, both an earlier announcement and an announcement that triggered the period may be rendered used. In other embodiments, only the earlier announcement may be rendered used. Accordingly, the later announcement period may still trigger a submission period when it passes. So, when a new announcement set begins, it may begin based on that previously submitted announcement. Accordingly, a first announcement period of the second set may effectively be shorter than the five seconds because it began as part of the previous announcement set.

In some embodiments, a broker device may track such actions and submit such announcements to make such functionality possible by recording events, displaying interface information and submitting information (e.g., to a marketplace). For example, a broker or other trader may indicate to a computing device to keep an announce window open. The device may act to submit announces to keep the window open until instructed otherwise (e.g., such as by being instructed to request a cross). In some embodiments, a marketplace may facilitate such functionality by making such announcements and tracking such information on behalf of a broker.

In some embodiments, a number of times (e.g., 2, 5, 10, 100, 2000, etc.) that a announcement set may continue to stay open and make announcements may be limited. Such limitation may be established by a marketplace and/or a broker. In some embodiments, after that amount of announcements, some break may be required to be taken (e.g., a new set starting with a full announce period may be required, some time (e.g., 5, seconds, 30 seconds, 1 minute, 1 hour, etc.) with no announce may be required, etc.). In other embodiments, a charge may be incurred after such threshold number for additional announcements in a set.

It should be recognized that the examples of 5 and 25 seconds of periods is given as non-limiting. Other embodiments may include any desired time period and one of ordinary skill in the art would understand how such examples would apply thereto.

In some embodiments, an algorithmic trader may user such a marketplace to engage in trading. Such algorithm may be configured to open and/or close an announcement set as it sees fit. For example, such algorithm may determine a chance that it will desire to engage in a cross in some amount of time in the future. If that chance exceeds some threshold (e.g., 50%, 90%, etc.), then in response, the algorithm may start an announcement set. If the algorithm then decides that it desires to make engage in a cross, then the algorithm may submit the cross immediately provided it is after an initial announce period of the announcement set. This may reduce delays for the algorithm. If the algorithm, on the other hand determines that the chance drops below the threshold, then the announcement set may be closed (e.g., no further announcement in the set may be submitted). This may reduce costs in an embodiment that charges for announcing.

FIG. 2 illustrates an example GUI interface that may be used in some embodiments to facilitate a submission of a request for cross. As illustrated, the interface includes an announce button that allows a broker to submit a request for quote that starts an announcement period. A time line shows a current state of a trade submission. For example, a red portion/leftmost portion may indicate that a request for cross is not submittable. When such functionality is blocked, a submit cross button may be disabled. After a time line passes this first period, a blue portion/second portion may be reached. During this second portion a request for cross may be submitted. During this second period a request for cross button may be enabled. When the second period has ended, the request for cross submit functionality may again be disabled. The interface may allow entry of parameters for the trade (e.g., price, size, parties, clearinghouse, etc.). In some embodiments parameters may be set outside of such an interface (e.g., a default clearinghouse for a broker may be set elsewhere). As illustrated, the interface includes a submit cross button that allows the broker to submit a request for cross with the defined parameters during the second period of time.

It should be recognized that this example display is non-limiting and that other embodiments may include other interfaces.

Figure 6:
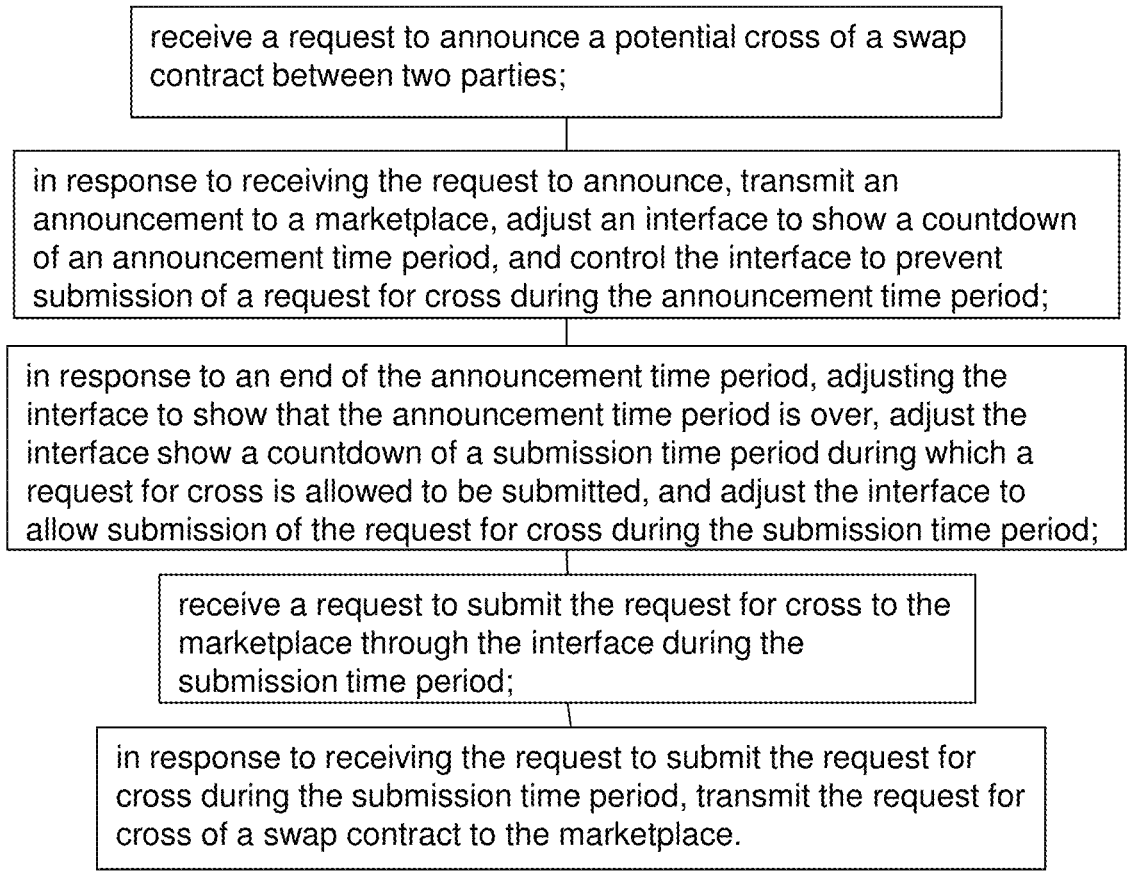
FIG. 6 shows an example method according to some embodiments.

FIG. 6 illustrates an example method that may be used to facilitate an interface's functionality in some embodiments. Such a method may be performed by and/or with a computing device such as an electronic marketplace and/or a broker or other market participant's computer device.

As indicated, the method of FIG. 6 may include receiving a request to announce a potential cross of a swap contract between two parties. Such a request may be received, for example in response to clicking the announce button in the interface of FIG. 2.

As indicated, the method of FIG. 6 may include in response to receiving the request to announce, transmit an announcement to a marketplace, adjust an interface to show a countdown of an announcement time period, and control the interface to prevent submission of a request for cross during the announcement time period. For example, a broker computer may transmit an announce request to a marketplace. As another example, the interface of FIG. 2 may be controlled and/or adjusted so that a progress bar shows a countdown of an announcement period and that a submit cross button is inactive (e.g., greyed out). The transmission may include a transmission of a ticker symbol identifying a requested clearinghouse.

As indicated, the method of FIG. 6 may include in response to an end of the announcement time period, adjusting the interface to show that the announcement time period is over, adjust the interface show a countdown of a submission time period during which a request for cross is allowed to be submitted, and adjust the interface to allow submission of the request for cross during the submission time period. For example, the interface of FIG. 2 may be adjusted so that a submit cross button is active, a cross submission period countdown is shown (such as a progress bar) and that an announcement timer is hidden (such as a progress bar passing a threshold). An example after these adjustments is shown in FIG. 2.

As indicated, the method of FIG. 6 may include receiving a request to submit the request for cross to the marketplace through the interface during the submission time period. For example, a user may click on a submit cross button.

As indicated, the method of FIG. 6 may include in response to receiving the request to submit the request for cross during the submission time period, transmit the request for cross of a swap contract to the marketplace. For example, a broker computer may transmit a request for cross to an electronic marketplace through a network.

In some embodiments, a user of an interface may make a change to one or more parties before submitting a request for cross. In some embodiments, an interface may be used to establish an open submission time period. For example, a user may use an interface to request an extension to a submission time. Such a request may be received with sufficient time to make a subsequent request such as in the various examples of submission time extension escribed elsewhere (e.g., with respect to FIG. 5). A computing device may submit additional requests to announce a potential cross to a marketplace to facilitate keeping a submission window open for an extended amount of time. This may continue for a number of cycles as desired (e.g., until a cross is submitted).

It should be recognized that elements of such a method may not all be performed in some embodiments. For example, there may be no announce timer, there may be no submission timer, there may be no adjustment regarding a submit cross button, and/or other elements may differ as desired.

FIG. 7 illustrates an example listing format that may be used by a marketplace to list swap contracts. In response to receiving a request for quote and/or other indication that may prompt listing or publishing of a contract, a marketplace may list or publish a contract for trading. To list the contract, the marketplace may use a standardized symbol format that allows traders to easily identify a listed contract. The format may include parameters of the contract so that a trader can quickly understand what is being listed without needing further information. The marketplace may use the illustrated standard to determine a symbol for the listing.

For example, the standard indicates that the symbol begins with an indicator of the clearinghouse to be used followed by a break. The example break is a -. Next the symbol includes a fixed leg section. The fixed leg section identifies the term and rate type for the fixed rate leg. These two pieces of information are separated by a break in the form of a _. The symbol then includes a floating leg section. The floating leg section identifies the frequency and rate for the floating leg side of the trade. These two pieces of information are separated by a break in the form of a _. The fixed and floating legs portion are separated by a break in the form of a "_v_".

The clearinghouse portion may be one character is size. The fixed leg term portion may be 2 characters in size. The fixed leg rate type portion may be two characters in size. The floating leg frequency portion may be two characters in size. The floating leg rate portion may be three characters in size. As an example, L-7Y_sb_v_3M_USL may indicate a LCH clearinghouse is used for a swap that has a fixed leg based on a 7 year semi annual bond and a floating leg based on a 3 month US LIBOR.

A marketplace may receive a ticker symbol as part of an order, an indication, a request for cross or so on in accordance with a standard such as that of FIG. 7. The marketplace may parse the ticker symbol to determine elements of how to execute a trade. For example, a marketplace may compare a clearinghouse portion to a table of clearinghouses to determine which clearinghouse to use to facilitate execution of a cross in response.

It should be recognized that this example format is non-limiting and that other embodiments may include other formats. For example, the sizes, positions and/or break characters may be changed in some embodiments.

Other embodiments may not use such a ticker format at all. In such embodiments, requests for crosses, indications of swap contracts, and so on may identify a clearinghouse in any desired manner or not at all. For example, a clearinghouse may be identified separately, negotiated by parties separately and so on. In still other embodiments, a clearinghouse may be treated as fungible and not an important part of a listing.

Some embodiments discuss timers, amounts of time, and/or events in response to a trigger. For example, amounts of time or triggers may happen when a transmission is made (e.g., a transmission to being an announcement period), at a receipt of a request (e.g., at a receipt of a request to make an announcement), and/or at a time when a processing is finished (e.g., when an announcement is transmitted to others, received by others, made public). It should be recognized that examples of a time starting or event triggering at one of such example moments is given as non-limiting and that times may start or events triggered as desired at any of such instances. Moreover, some embodiments may discuss events being required to happen before an end of a period or event ending. It should be recognized that the happening of such an event may include a transmission requesting the happening, a processing of such a request and/or a receipt of such a request. A description of one of such timings should be similarly understood as non-limiting.

Various methods, systems, and interfaces are given as non-limiting examples only. Examples may be combined in any manner. Examples may take any order, exclude any element, or include any additional element as desired.

The following sections I-X provide a guide to interpreting the present application.

I. Terms

The term "product" means any machine, manufacture and/or composition of matter, unless expressly specified otherwise.

The term "process" means any process, algorithm, method or the like, unless expressly specified otherwise.

Each process (whether called a method, algorithm or otherwise) inherently includes one or more steps, and therefore all references to a "step" or "steps" of a process have an inherent antecedent basis in the mere recitation of the term 'process' or a like term. Accordingly, any reference in a claim to a 'step' or 'steps' of a process has sufficient antecedent basis.

The term "invention" and the like mean "the one or more inventions disclosed in this application", unless expressly specified otherwise.

The terms "an embodiment", "embodiment", "embodiments", "the embodiment", "the embodiments", "one or more embodiments", "some embodiments", "certain embodiments", "one embodiment", "another embodiment"

and the like mean "one or more (but not all) embodiments of the disclosed invention(s)", unless expressly specified otherwise.

The term "variation" of an invention means an embodiment of the invention, unless expressly specified otherwise.

A reference to "another embodiment" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not necessarily limited to", unless expressly specified otherwise. Thus, for example, the sentence "the portfolio includes a red widget and a blue widget" means the portfolio includes the red widget and the blue widget, but may include something else.

The term "consisting of" and variations thereof means "including and limited to", unless expressly specified otherwise. Thus, for example, the sentence "the portfolio consists of a red widget and a blue widget" means the portfolio includes the red widget and the blue widget, but does not include anything else.

The term "compose" and variations thereof means "to make up the constituent parts of, component of or member of", unless expressly specified otherwise. Thus, for example, the sentence "the red widget and the blue widget compose a portfolio" means the portfolio includes the red widget and the blue widget.

The term "exclusively compose" and variations thereof means "to make up exclusively the constituent parts of, to be the only components of or to be the only members of", unless expressly specified otherwise. Thus, for example, the sentence "the red widget and the blue widget exclusively compose a portfolio" means the portfolio consists of the red widget and the blue widget, and nothing else.

The terms "a", "an" and "the" mean "one or more", unless expressly specified otherwise.

The term "plurality" means "two or more", unless expressly specified otherwise.

The term "herein" means "in the present application, including anything which may be incorporated by reference", unless expressly specified otherwise.

The phrase "at least one of", when such phrase modifies a plurality of things (such as an enumerated list of things) means any combination of one or more of those things, unless expressly specified otherwise. For example, the phrase "at least one of a widget, a car and a wheel" means either (i) a widget, (ii) a car, (iii) a wheel, (iv) a widget and a car, (v) a widget and a wheel, (vi) a car and a wheel, or (vii) a widget, a car and a wheel. The phrase "at least one of", when such phrase modifies a plurality of things does not mean "one of each of" the plurality of things.

Numerical terms such as "one", "two", etc. when used as cardinal numbers to indicate quantity of something (e.g., one widget, two widgets), mean the quantity indicated by that numerical term, but do not mean at least the quantity indicated by that numerical term. For example, the phrase "one widget" does not mean "at least one widget", and therefore the phrase "one widget" does not cover, e.g., two widgets.

The phrase "based on" does not mean "based only on", unless expressly specified otherwise. In other words, the phrase "based on" describes both "based only on" and "based at least on". The phrase "based at least on" is equivalent to the phrase "based at least in part on".

The term "represent" and like terms are not exclusive, unless expressly specified otherwise. For example, the term "represents" does not mean "represents only", unless expressly specified otherwise. In other words, the phrase "the data represents a credit card number" describes both "the data represents only a credit card number" and "the data represents a credit card number and the data also represents something else".

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

The term "e.g." and like terms mean "for example", and thus does not limit the term or phrase it explains. For example, in the sentence "the computer sends data (e.g., instructions, a data structure) over the Internet", the term "e.g." explains that "instructions" are an example of "data" that the computer may send over the Internet, and also explains that "a data structure" is an example of "data" that the computer may send over the Internet. However, both "instructions" and "a data structure" are merely examples of "data", and other things besides "instructions" and "a data structure" can be "data".

The term "respective" and like terms mean "taken individually". Thus if two or more things have "respective" characteristics, then each such thing has its own characteristic, and these characteristics can be different from each other but need not be. For example, the phrase "each of two machines has a respective function" means that the first such machine has a function and the second such machine has a function as well. The function of the first machine may or may not be the same as the function of the second machine.

The term "i.e." and like terms mean "that is", and thus limits the term or phrase it explains. For example, in the sentence "the computer sends data (i.e., instructions) over the Internet", the term "i.e." explains that "instructions" are the "data" that the computer sends over the Internet.

Any given numerical range shall include whole and fractions of numbers within the range. For example, the range "1 to 10" shall be interpreted to specifically include whole numbers between 1 and 10 (e.g., 1, 2, 3, 4, . . . 9) and non-whole numbers (e.g., 1.2, . . . 1.9).

Where two or more terms or phrases are synonymous (e.g., because of an explicit statement that the terms or phrases are synonymous), instances of one such term/phrase does not mean instances of another such term/phrase must have a different meaning. For example, where a statement renders the meaning of "including" to be synonymous with "including but not limited to", the mere usage of the phrase "including but not limited to" does not mean that the term "including" means something other than "including but not limited to".

II. Determining

The term "determining" and grammatical variants thereof (e.g., to determine a price, determining a value, determine an object which meets a certain criterion) is used in an extremely broad sense. The term "determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory)

and the like. Also, "determining" can include resolving, selecting, choosing, establishing, and the like.

The term "determining" does not imply certainty or absolute precision, and therefore "determining" can include estimating, extrapolating, predicting, guessing and the like.

The term "determining" does not imply that mathematical processing must be performed, and does not imply that numerical methods must be used, and does not imply that an algorithm or process is used.

The term "determining" does not imply that any particular device must be used. For example, a computer need not necessarily perform the determining.

III. Forms of Sentences

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to the limitation (e.g., "the widget"), this does not imply that the first claim covers only one of the feature, and this does not imply that the second claim covers only one of the feature (e.g., "the widget" can cover both one widget and more than one widget).

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device, article or other product is described herein, more than one device/article (whether or not they cooperate) may alternatively be used in place of the single device/article that is described. Accordingly, the functionality that is described as being possessed by a device may alternatively be possessed by more than one device/article (whether or not they cooperate).

Similarly, where more than one device, article or other product is described herein (whether or not they cooperate), a single device/article may alternatively be used in place of the more than one device or article that is described. For example, a plurality of computer-based devices may be substituted with a single computer-based device. Accordingly, the various functionality that is described as being possessed by more than one device or article may alternatively be possessed by a single device/article.

The functionality and/or the features of a single device that is described may be alternatively embodied by one or more other devices which are described but are not explicitly described as having such functionality/features. Thus, other embodiments need not include the described device itself, but rather can include the one or more other devices which would, in those other embodiments, have such functionality/features.

IV. Disclosed Examples and Terminology Are Not Limiting

Neither the Title (set forth at the beginning of the first page of the present application) nor the Abstract (set forth at the end of the present application) is to be taken as limiting in any way as the scope of the disclosed invention(s), is to be used in interpreting the meaning of any claim or is to be used in limiting the scope of any claim. An Abstract has been included in this application merely because an Abstract is required under 37 C.F.R. § 1.72(b).

The title of the present application and headings of sections provided in the present application are for convenience only, and are not to be taken as limiting the disclosure in any way.

Numerous embodiments are described in the present application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

Though an embodiment may be disclosed as including several features, other embodiments of the invention may include fewer than all such features. Thus, for example, a claim may be directed to less than the entire set of features in a disclosed embodiment, and such claim would not include features beyond those features that the claim expressly recites.

No embodiment of method steps or product elements described in the present application constitutes the invention claimed herein, or is essential to the invention claimed herein, or is coextensive with the invention claimed herein, except where it is either expressly stated to be so in this specification or expressly recited in a claim.

The preambles of the claims that follow recite purposes, benefits and possible uses of the claimed invention only and do not limit the claimed invention.

The present disclosure is not a literal description of all embodiments of the invention(s). Also, the present disclosure is not a listing of features of the invention(s) which must be present in all embodiments.

All disclosed embodiment are not necessarily covered by the claims (even including all pending, amended, issued and canceled claims). In addition, an embodiment may be (but need not necessarily be) covered by several claims. Accordingly, where a claim (regardless of whether pending, amended, issued or canceled) is directed to a particular embodiment, such is not evidence that the scope of other claims do not also cover that embodiment.

Devices that are described as in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for long period of time (e.g. weeks at a time). In addition, devices that are in communication with each other may communicate directly or indirectly through one or more intermediaries.

A description of an embodiment with several components or features does not imply that all or even any of such components/features are required. On the contrary, a variety of optional components are described to illustrate the wide variety of possible embodiments of the present invention(s). Unless otherwise specified explicitly, no component/feature is essential or required.

Although process steps, algorithms or the like may be described or claimed in a particular sequential order, such processes may be configured to work in different orders. In other words, any sequence or order of steps that may be explicitly described or claimed does not necessarily indicate a requirement that the steps be performed in that order. The steps of processes described herein may be performed in any order possible. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention(s), and does not imply that the illustrated process is preferred.

Although a process may be described as including a plurality of steps, that does not imply that all or any of the steps are preferred, essential or required. Various other embodiments within the scope of the described invention(s) include other processes that omit some or all of the described steps. Unless otherwise specified explicitly, no step is essential or required.

Although a process may be described singly or without reference to other products or methods, in an embodiment the process may interact with other products or methods. For example, such interaction may include linking one business model to another business model. Such interaction may be provided to enhance the flexibility or desirability of the process.

Although a product may be described as including a plurality of components, aspects, qualities, characteristics and/or features, that does not indicate that any or all of the plurality are preferred, essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

An enumerated list of items (which may or may not be numbered) does not imply that any or all of the items are equivalent to each other or readily substituted for each other.

All embodiments are illustrative, and do not imply that the invention or any embodiments were made or performed, as the case may be.

V. Computing

It will be readily apparent to one of ordinary skill in the art that the various processes described herein may be implemented by, e.g., appropriately programmed general purpose computers, special purpose computers and computing devices. Typically a processor (e.g., one or more microprocessors, one or more microcontrollers, one or more digital signal processors) will receive instructions (e.g., from a memory or like device), and execute those instructions, thereby performing one or more processes defined by those instructions. Instructions may be embodied in, e.g., one or more computer programs, one or more scripts.

A "processor" means one or more microprocessors, central processing units (CPUs), computing devices, microcontrollers, digital signal processors, or like devices or any combination thereof, regardless of the architecture (e.g., chip-level multiprocessing/multi-core, RISC, CISC, Microprocessor without Interlocked Pipeline Stages, pipelining configuration, simultaneous multithreading).

Thus a description of a process is likewise a description of an apparatus for performing the process. The apparatus that performs the process can include, e.g., a processor and those input devices and output devices that are appropriate to perform the process.

Further, programs that implement such methods (as well as other types of data) may be stored and transmitted using a variety of media (e.g., computer readable media) in a number of manners. In some embodiments, hard-wired circuitry or custom hardware may be used in place of, or in combination with, some or all of the software instructions that can implement the processes of various embodiments. Thus, various combinations of hardware and software may be used instead of software only.

The term "computer-readable medium" refers to any medium, a plurality of the same, or a combination of different media, that participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols, such as Ethernet (or IEEE 802.3), SAP, ATP, Bluetooth☐, and TCP/IP, TDMA, CDMA, and 3G; and/or (iv) encrypted to ensure privacy or prevent fraud in any of a variety of ways well known in the art.

Thus a description of a process is likewise a description of a computer-readable medium storing a program for performing the process. The computer-readable medium can store (in any appropriate format) those program elements which are appropriate to perform the method.

Just as the description of various steps in a process does not indicate that all the described steps are required, embodiments of an apparatus include a computer/computing device operable to perform some (but not necessarily all) of the described process.

Likewise, just as the description of various steps in a process does not indicate that all the described steps are required, embodiments of a computer-readable medium storing a program or data structure include a computer-readable medium storing a program that, when executed, can cause a processor to perform some (but not necessarily all) of the described process.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device which accesses data in such a database.

Various embodiments can be configured to work in a network environment including a computer that is in communication (e.g., via a communications network) with one or more devices. The computer may communicate with the devices directly or indirectly, via any wired or wireless medium (e.g. the Internet, LAN, WAN or Ethernet, Token Ring, a telephone line, a cable line, a radio channel, an optical communications line, commercial on-line service providers, bulletin board systems, a satellite communications link, a combination of any of the above). Each of the devices may themselves comprise computers or other computing devices, such as those based on the Intel® Pentium® or Centrino™ processor, that are adapted to communicate with the computer. Any number and type of devices may be in communication with the computer.

In an embodiment, a server computer or centralized authority may not be necessary or desirable. For example, the present invention may, in an embodiment, be practiced on one or more devices without a central authority. In such an embodiment, any functions described herein as performed by the server computer or data described as stored on the server computer may instead be performed by or stored on one or more such devices.

Where a process is described, in an embodiment the process may operate without any user intervention. In another embodiment, the process includes some human intervention (e.g., a step is performed by or with the assistance of a human).

VI. Continuing Applications

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application.

Applicants intend to file additional applications to pursue patents for subject matter that has been disclosed and enabled but not claimed in the present application.

VII. Disclaimer

Numerous references to a particular embodiment do not indicate a disclaimer or disavowal of additional, different embodiments, and similarly references to the description of embodiments which all include a particular feature do not indicate a disclaimer or disavowal of embodiments which do not include that particular feature. A clear disclaimer or disavowal in the present application shall be prefaced by the phrase "does not include" or by the phrase "cannot perform".

What is claimed is:

1. An apparatus comprising:
one or more processors of an electronic trading venue, in which the one or more processors is configured to control:
generating an indication of a swap contract on a first remote computing device of a first market participant, the first remote computing device including a first user interface having a request for quote section, a request for cross section adjacent to the request for quote section, and a progress bar responsive to both a first countdown timer and a second countdown timer, wherein the request for quote section includes a request to announce button, the request for cross section includes a submit cross button, and the generating occurs in response to selecting the request to announce button on the first user interface;
receiving, over a communication network, the indication of the swap contract from the first remote computing device of the first market participant;
in response to receiving the indication of the swap contract, displaying, over the communication network, a public announcement of a potential crossing of the swap contract on second user interfaces respectively of second remote computing devices of second market participants of the electronic trading venue;
in response to receiving the indication of the swap contract, tracking using a first electronic timer of the apparatus a first period of time and assigning a numerical identifier to the potential crossing;
in response to receiving the indication of the swap contract,
displaying, over the communication network, on the first user interface of the first remote computing device of the first market participant, the progress bar together with the first countdown timer showing a real time count down of the first period of time being timed on the first electronic timer, and disabling, over the communication network, during the first period of time, an operation state of the submit cross button on the first user interface of the first remote computing device that provides a functionality on the first user interface to submit a request for cross;

after the first period of time has passed, and for a second period of time counted on a second electronic timer of the apparatus, enabling, over the communication network, the operation state of the submit cross button on the first user interface of the first remote computing device;

after the first period of time has passed, displaying, over the communication network, on the first user interface the first countdown timer with an indication that the first period of time is over, and the progress bar together with the second countdown timer showing a real time count down of the second period of time being timed on the second electronic timer;

displaying, over the communication network, on the request for cross section of the first user interface adjacent to the submit cross button, two parties, a ticker symbol of the swap contract, the numerical identifier, a price and a quantity;

receiving, over the communication network, the request for cross from the first remote computing device during the second period of time in response to selecting the request for cross button on the first user interface, in which the request for cross identifies the two parties, the ticker symbol of the swap contract, the numerical identifier, the price and the quantity;

verifying that the request for cross includes the numerical identifier;

determining that no better price than the price for the request for cross exists in the market for either of the two parties;

determining that an equal price to the price for one of the two parties with a better time priority than the request for cross exists in the market;

determining, based on the ticker symbol of the swap contract and a database mapping ticker symbols and clearinghouses, a clearinghouse for the cross; and in response to verifying the numerical identifier, determining that no better price than the price exists and determining the clearinghouse, facilitating execution of the cross between the two parties at the price and for the quantity through the clearinghouse.

2. The apparatus of claim 1, in which the one or more processors is configured to control:

at a time equal in length to the first period of time before the second period of time ends, receiving, over the communication network, a second indication of the swap contract from the first remote computing device of the first market participant;

in response to receiving the second indication of the swap contract, displaying, over the communication network, a public re-announcement of the potential crossing of the swap contract on the second user interfaces respectively of the second remote computing devices; and in response to receiving the second indication of the swap contract, continuing to allow facilitation of the request for cross for an extra period of time after the second period of time ends.

3. The apparatus of claim 1, in which the first market participant includes a broker.

4. An apparatus comprising:

one or more processors of an electronic trading venue, in which the one or more processors is configured to control:

generating an indication of a swap contract on a first remote computing device of a first market participant, the first remote computing device including a first user interface having a request for quote section, a request for cross section adjacent to the request for quote section, and a progress bar responsive to both a first countdown timer and a second countdown timer, wherein the request for quote section includes a request to announce button, the request for cross section includes a submit cross button, and the generating occurs in response to selecting the request to announce button on the first user interface;

receiving, over a communication network, the indication of the swap contract including a ticker symbol of the swap contract from the first remote computing device of the first market participant, in which the ticker symbol identifies a clearinghouse to be used for trades in the swap contract;

in response to receiving the indication of the swap contract including the ticker symbol, displaying, over the communication network, a public announcement of a potential crossing of the swap contract on second user interfaces respectively of second remote computing devices of second market participants of the electronic trading venue;

in response to receiving the indication of the ticker symbol, tracking using a first electronic timer of the apparatus a first period of time and assigning a numerical identifier to the potential crossing;

in response to receiving the indication of the swap contract, displaying, over the communication network, on the first user interface of the first remote computing device of the first market participant, the progress bar together with the first countdown timer showing a real time count down of the first period of time being timed on the first electronic timer, and disabling, over the communication network, during the first period of time, an operation state of the submit cross button on the first user interface of the first remote computing device that provides a functionality on the first user interface to submit a request for cross;

after the first period of time has passed, and for a second period of time counted on a second electronic timer of the apparatus, enabling, over the communication network, an operation state of the first remote computing device that provides the functionality on the first user interface to submit the request for cross in the swap contract;

after the first period of time has passed, displaying, over the communication network, on the first user interface the progress bar together with the second countdown timer showing a real time count down of the second period of time being timed on the second electronic timer;

displaying, over the communication network, on the request for cross section of the first user interface adjacent to the submit cross button, two parties, a ticker symbol of the swap contract, the numerical identifier, a price and a quantity;

receiving, over the communication network, the request for cross identifying the ticker symbol, from the first remote computing device, during the second period of time in response to selecting the request for cross button on the first user interface, in which the request for cross identifies the two parties, the ticker symbol of the swap contract, the numerical identifier, the price and the quantity;

verifying that the request for cross includes the numerical identifier;

determining the clearinghouse based on the ticker symbol and a database mapping ticker symbols and clearinghouses;

determining that, compared to the price, a better price for fulfilling at least a portion of the request for cross for at least one of the two parties exists in the market; and in response to verifying the numerical identifier and determining the clearinghouse, facilitating execution of the cross using the clearinghouse, in which facilitating execution of the cross includes facilitating execution of the at least the portion at the better price.

5. The apparatus of claim 4, in which the one or more processors is configured to control:

determining that an equal price for the request for cross for one of the two parties with a better time priority than the cross exists in the market; and in which facilitating the execution includes facilitate execution of the cross between the two parties at the price and for the quantity.

6. The apparatus of claim 4, in which the one or more processors is configured to control:

at a time equal in length to the first period of time before the second period of time ends, receiving, over the communication network, a second indication of the swap contract from the first remote computing device of the first market participant;

in response to receiving the second indication of the swap contract, displaying, over the communication network, a public re-announcement of the potential crossing of the swap contract on the second user interfaces respectively of the second remote computing devices; and in response to receiving the second indication of the swap contract, continuing to allow facilitation for an extra period of time after the second period of time ends.

7. The apparatus of claim 4, in which facilitating execution includes facilitating execution with at least one party and another party that is different from either of the two parties.

8. The apparatus of claim 4, in which facilitating execution includes facilitating execution between the two parties.

9. An apparatus comprising:
one or more processors of an electronic trading venue, in which the one or more processors is configured to control:
generating a first indication of a swap contract on a first remote computing device of a first market participant, the first remote computing device including a first user interface having a request for quote section, a request for cross section adjacent to the request for quote section, and a progress bar responsive to both a first countdown timer and a second countdown timer, wherein the request for quote section includes a request to announce button, the request for cross section includes a submit cross button, and the generating occurs in response to selecting the request to announce button on the first user interface;

receiving, over a communication network, the first indication of the swap contract from the first remote computing device of the first market participant;

in response to receiving the first indication of the swap contract, displaying, over the communication network, a public announcement of a potential crossing of the swap contract on second user interfaces respectively of second remote computing devices of second market participants of the electronic trading venue;

in response to receiving the first indication of the swap contract, tracking using a first electronic timer of the apparatus a first period of time and assigning a numerical identifier to the potential crossing;

in response to receiving the first indication of the swap contract,
displaying, over the communication network, on the first user interface of the first remote computing device of the first market participant, the progress bar together with the first countdown timer showing a real time count down of the first period of time being timed on the first electronic timer; and
disabling, over the communication network, during the first period of time, an operation state of the submit cross button on the first user interface of the first remote computing device that provides a functionality on the first user interface to submit a request for cross;

after the first period of time has passed, and for a second period of time counted on a second electronic timer of the apparatus, enabling, over the communication network, the operation state of the submit cross button on the first user interface of the first remote computing device;

after the first period of time has passed, displaying, over the communication network, on the first user interface the progress bar together with the second countdown timer showing a real time count down of the second period of time being timed on the second electronic timer;

displaying, over the communication network, on the request for cross section of the first user interface adjacent to the submit cross button, two parties, a ticker symbol of the swap contract, the numerical identifier, a price and a quantity;

after the first period of time before the second period of time ends, generating a public re-announcement of a potential crossing of the swap contract in response to selecting the request to announce button on the first user interface;

after the first period of time before the second period of time ends, receiving, over the communication network, a second indication of the swap contract from the first remote computing device of the first market participant associated with the public re-announcement of the potential crossing of the swap contract;

in response to receiving the second indication of the swap contract, displaying, over the communication network, the public re-announcement of the potential crossing of the swap contract on the second user interfaces respectively of the second remote computing devices;

in response to receiving the second indication of the swap contract, allowing facilitation of the request for cross in the swap contract by the first market participant for the second period of time after receiving the second indication so that a total amount of time that facilitation of the request for cross is allowed by the first market participant includes twice the second period of time based on the first and second indications of the swap contract;

displaying, over the communication network, on the request for cross section of the first user interface adjacent to the submit cross button, two parties, a ticker symbol of the swap contract, the numerical identifier, a price and a quantity;

receiving, over the communication network, the request for cross from the first remote computing device of the first market participant during the total amount of time, in which the request for cross identifies the two parties, the ticker symbol of the swap contract, the numerical identifier, the price and the quantity;

verifying that the request for cross includes the numerical identifier;

determining, based on the ticker symbol of the swap contract and a database mapping ticker symbols and clearinghouses, a clearinghouse for the cross; and in response to verifying the numerical identifier and determining the clearinghouse, facilitating execution of the cross through the clearinghouse.

10. The apparatus of claim 9, in which the one or more processors is configured to control:

at a time when twice the second period of time has passed from receiving the first indication of the swap contract, receiving, over the communication network, a third indication of the swap contract from the first remote computing device of the first market participant;

in response to receiving the third indication of the swap contract, displaying, over the communication network, a public re-announcement of the potential crossing of the swap contract on the second user interfaces respectively of the second remote computing devices; and in response to receiving the third indication of the swap contract, allowing facilitation of the request for cross in the swap contract by the first market participant for the second period of time after receiving the third indication so that the total amount of time that facilitation of the request for cross is allowed by the first market participant includes three times the second period of time based on the first, second, and third indications of the swap contract.

11. The apparatus of claim 9, in which the one or more processors is configured to control:

determining that an equal price for the request for cross for one of the two parties with a better time priority than the cross exists in the market; and in which facilitating the execution includes facilitate execution of the cross between the two parties at the price and for the quantity.

12. The apparatus of claim 9, in which the one or more processors is configured to control:

determining that, compared to the price, a better price for fulfilling at least a portion of the request for cross for at least one of the two parties exists in the market; and in which facilitating execution of the cross includes facilitating execution of the at least the portion at the better price.

13. The apparatus of claim 12, in which facilitating execution includes facilitating execution with at least one party and another party that is different from either of the two parties.

14. The apparatus of claim 12, in which facilitating execution includes facilitating execution between the two parties.

15. The apparatus of claim 1, in which allowing facilitation of the request for cross includes adjusting, over the communication network, the first user interface of the first remote computing device to allow submission of the request for cross.

* * * * *